United States Patent [19]
Smuk

[11] Patent Number: 6,152,533
[45] Date of Patent: Nov. 28, 2000

[54] SLIDE/FOLD/EZ ENTRY SEAT MECHANISM

[75] Inventor: Wojciech Smuk, Troy, Mich.

[73] Assignee: Bertrand Faure Components Ltd., Mississauga, Canada

[21] Appl. No.: 09/424,641

[22] PCT Filed: May 25, 1998

[86] PCT No.: PCT/CA98/00508

§ 371 Date: Nov. 26, 1999

§ 102(e) Date: Nov. 26, 1999

[87] PCT Pub. No.: WO98/54024

PCT Pub. Date: Dec. 3, 1998

Related U.S. Application Data

[60] Provisional application No. 60/047,702, May 27, 1997.

[51] Int. Cl.[7] .................................................. B60N 2/20
[52] U.S. Cl. ........................ 297/341; 297/378.12
[58] Field of Search .................. 297/341, 378.12, 297/15; 248/429, 430

[56] References Cited

U.S. PATENT DOCUMENTS

| | | | |
|---|---|---|---|
| 4,101,169 | 7/1978 | Muraishi et al. | 297/341 |
| 5,482,349 | 1/1996 | Richter et al. | 297/341 X |
| 5,527,087 | 6/1996 | Takeda et asl. | 297/378.12 X |
| 5,570,931 | 11/1996 | Kargilis et al. | 297/341 X |
| 5,597,206 | 1/1997 | Ainsworth et al. | 297/378.12 |
| 5,718,477 | 2/1998 | Schüler | 297/341 |
| 5,873,629 | 2/1999 | Schuler | 297/341 |

FOREIGN PATENT DOCUMENTS

| | | |
|---|---|---|
| 373081 | 6/1990 | European Pat. Off. . |
| 3608827 | 10/1987 | Germany . |

*Primary Examiner*—Peter R. Brown
*Attorney, Agent, or Firm*—Patrick J. Hofbauer

[57] ABSTRACT

A vehicle seat assembly (20) attachable to a vehicle floor (21) has a seat back support frame foldable over a seat support frame and at least two seat track assemblies (22, 22') which provide for controlled adjustment of the seat assembly relative to the vehicle floor. An associated recliner mechanism (32) has a single lever acting as a control handle to permit controlled adjustment of the inclination angle of the backrest, to allow for forward dumping of the backrest over the seat support frame (29) and to permit forward downward folding of the seat support frame (29), as part of a parallelogram mechanism, thereby to permit collapsing of the seat support structure toward the vehicle floor (21) and forward dumping of the seat back, thereby to provide more volume for cargo within the vehicle, without the need for removing the seat assembly (20). An E-Z entry mechanism may also be incorporated into the assembly.

10 Claims, 11 Drawing Sheets

SLIDE/FOLD/EZ ENTRY SEAT MECHANISM

This application claims the benefit of U.S. Provisional Application No. 60/047,702, filed May 27, 1997.

FIELD OF THE INVENTION

The present invention relates to a seat apparatus for a vehicle, and in particular to a seat apparatus with an E-Z entry mechanism.

BACKGROUND OF THE INVENTION

Passenger cars and utility type vehicles, such as minivans, station wagons, hatchbacks, sport-utility vehicles, and the like, are commonly constructed such that the backs of one or more of the vehicle seat assemblies may be folded forward so that the seat back is substantially horizontal (sometimes known as dumping), thus permitting luggage and the like to be stowed on top of the seat back. It is preferable that the vehicle seat assemblies also be able to be lowered closer to the vehicle floor when the seat back is folded, in order to increase the headroom above the folded seat back. In addition, it is sometimes desirable, for the seat, e.g. a front seat, or a second row seat in a mini-van to be moved forward in order to temporarily provide more space behind the seat. Such is the case with seats with so-called E-Z entry features. Furthermore, it is common for vehicle seats, particularly front vehicle seats, to have a reclining mechanism for the seat back. Several mechanisms are known for controlling the features of reclining seat backs, dumping of seat backs, lowering of the seat assembly as the seat back is dumped, and fore and aft movement of seat assemblies. To Applicant's knowledge, none provide for a mechanism with a single controlling means, e.g. a lever, to control all four features, and an independent control over the reclining feature.

E-Z entry mechanisms are known, wherein the seat track lock is automatically released to allow forward sliding of the seat assembly within the vehicle upon dumping of the seat back support. Various types of E-Z entry mechanisms have been patented, and most of these mechanism include a biasing spring which automatically pulls the entire seat assembly forward upon release of the track lock through the agency of the E-Z entry mechanism. An example of one such patented E-Z entry system is shown in U.S. Pat. No. 4,101,169, issued Jul. 18, 1978. These mechanisms are particularly prevalent in the prior art with respect to two door vehicles, so as to be actuated and provide more room for entry or egress of a passenger to the rear seat area of the vehicle. They are, however, also, of renewed interest in recent years in respect of mini-van applications.

It is also known in the art to mount the seat support to the vehicle floor by means of a parallelogram leg mechanism, such that the seat cushion can be selectively translated forwardly and downwardly toward the floor, in combination with dumping of the seat back support frame in order to provide more room for the storage of cargo on top of dumped seat back, for example as shown in U.S. Pat. No. 5,482,349, issued Jan. 9, 1996.

Furthermore, Takeda, et al., in U.S. Pat. No. 5,527,087, which issued Jun. 18, 1996, disclose a rear seat assembly which has a mechanism for simultaneously moving the seat back forward and the seat cushion forward and downward, so that the forward part of the seat pivots about a linkage and is able to drop into a well. The assembly does not have the features of a reclining seat, or means for moving the seat fore and aft, and thus there is no suggestion of any kind of mechanism suitable for control of such features in addition to the features disclosed.

Ainsworth et al., in U.S. Pat. No. 5,597,206, which issued Jan. 28, 1997, discloses a reclining seat which may be moved fore and aft on tracks which are mounted on a vehicle floor. The seat is equipped with a seat latch mechanism and an E-Z entry latch release mechanism for forward translational movement of the vehicle seat. The seat bottom is secured to the upper rails of the track assembly for fore and aft seat movement. The E-Z entry latch release mechanism is operably connected to the seat latch mechanism. Upon actuation of a dump handle, unlocking of the seat back latch permits forward pivoting of the seat back to a dumped position. The forward pivotal movement of the seat back causes the E-Z entry seat latch mechanism to be unlatched, allowing an assist spring to urge the seat to a forward position. There is no suggestion of a seat support structure which can be downwardly and forwardly translated to a stowed seat position or of a mechanism for controlling such movement.

Kargilis et al., in U.S. Pat. No. 5,570,931, which issued Nov. 5, 1996, discloses a seat for a motor vehicle having a horizontal seat cushion and an upright seat back supported on a longitudinally adjustable bi-level seat support frame. Front and rear seat track assemblies are provided at different elevations. A pair of front links are pivotally connected to the seat cushion and the seat frame. The rear portion of the seat is pivotally mounted to a rear track assembly latching mechanism. A seat back latch assembly is provided to lock the seat components in an upright position, and may be unlocked by means of an operating handle. Operation of the handle also permits pivoting movement of the links and thus downward and forward movement of the seat cushion to a stowed position. A separate handle is required to move the seat on the track assembly. Additionally, Kargilis et al. do not teach the use of a selectively adjustable reclining mechanism for the seat back, but rather employ a simple seat back latch.

There is a need for a cost effective, user friendly mechanism which permits a single control means to effect E-Z entry coupled with lowering of the seat assembly, with an optional independent control over a seat reclining feature.

While these functional features are individually known, to Applicant's knowledge there is no art which suggests or teaches the combination of forward translation of the entire seat assembly upon forward dumping of the seat back support frame, together with a downward translation of the seat support member toward the vehicle floor upon activation of the E-Z entry feature. Moreover, Applicant is not aware of any such mechanism which can achieve this composite functionally upon actuation of a single handle by the user, and utilizing a single recliner mechanism, or single recliner position latch. It is believed that any similar prior art mechanisms require the manipulation by the user of at least two separate control handles connected to two separate latching devices, one each to separately activate the functions firstly of dumping of the seat back support to actuate forward translation of seat assembly through activation of an E-Z entry mechanism; and secondly for downward translation of vehicle seat support frame relative to vehicle floor to obtain a "load floor" configuration.

SUMMARY OF THE INVENTION

Accordingly, the present invention provides a vehicle seat assembly, attachable to a vehicle floor, which vehicle seat assembly has a seat support frame, a seat back support frame, at least two seat track assemblies, at least two rear supports and a seat control assembly, wherein:

(a) each seat track assembly comprises a first track section attachable to the vehicle floor, and extending from front to rear when installed on the vehicle floor, a second track section which is slidably engaged with the first track section, and a track locking assembly having track locking means for locking first and second track sections together at any position from a forward position of the second track section to a rearward position of the second track section;

(b) each said rear supports are fixedly attached to a rear portion of a second track section and a bottom end of said seat back support frame is supported on the rear support, at a seat back pivot;

(c) a front of the seat support frame is supported by front links, each of which are pivotable at an upper end of the front link about the front of the seat support frame and are pivotable at a lower end of the front link about a front end of the second track section, and a rear of the said support frame is supported at a rear seat support pivot, said rear support pivot being attached to the seat back support frame between the seat back pivot and a head end of the seat back support frame; and (d) the seat control assembly has i) seat back locking means to lock the seat back support frame so that the seat back support frame is in a substantially upright position, ii) locking release means to release the seat back locking means so that the seat back support frame is able to pivot forwardly into a dump position and thus cause forward movement of the seat support frame and forward and downward movement of the front of the seat support frame about the upper pivots of the front links, and wherein the locking release means is interconnected with the track locking release means, for unlocking the track locking means when the seat back support frame is pivoted forwardly.

In one embodiment, the seat back locking means is able to lock the seat back support frame at the seat back pivot.

In a further embodiment, the seat back pivot has a reclining mechanism associated therewith.

In another embodiment, the seat back locking means has a rotary recliner which has inner and outer rotatable halves, said rotary recliner having a rotational axis coincident with the seat back pivot, said inner rotatable half being fixedly attached to the back support frame and the outer rotatable half being fixedly attached to a rear support, and the seat back locking means is able to lock the inner and outer halves in predetermined positions, and wherein the inner rotatable half has intermediate linkage means which 1) in a first instance permits limited forward rotation of the seat back support frame without causing the track locking means to unlock the first and second track sections, and 2) in a second instance, upon further forward rotation of the seat back support frame is connected to a track locking linkage which causes the track locking means to unlock the first and second track sections.

In yet another embodiment, the seat control assembly has a recliner control crank which is connected to the seat back locking means at the seat back pivot, the recliner control crank being operatively connected to an E-Z entry control handle, and the intermediate linkage comprises a link member with a first end attached to the inner rotatable half and a second end operatively attached to the track locking means, said link member having a lost motion mechanism therein, said lost motion permitting rotation of the seat back support frame in the first instance.

In another embodiment, the vehicle seat assembly additionally has a seat reclining control assembly which has recliner actuating means for operating the seat back locking means in the first instance and disconnection means for making the track unlocking linkage inoperative, said seat reclining control assembly being independent of the seat control assembly.

In a further embodiment, the seat control assembly has a recliner control crank which is connected to the seat back locking means at the seat back pivot, said recliner control crank being operatively connected to an E-Z entry control handle, and the intermediate linkage comprises an interlock link member with a first end attached to the inner rotatable half and second end which has engaging means for engaging with a hook of a pivotable interlock crank, said interlock crank being operatively connected to the track locking means;

said vehicle seat assembly additionally having a seat reclining control assembly which comprises a first class recliner lever which has a first arm and a second arm between which is a recliner lever pivot, said first arm being a manually operable handle and the second arm being cooperatively engaged with the interlock link member such that rotation of the recliner lever in a first direction removes the engaging means from being able to engage with the hook, said first arm having pivotally attached thereto a recliner actuation link with a lost motion mechanism at an end distal to the first arm, said recliner actuation link lost motion being operatively connected to the recliner control crank such that movement of the engaging means away from the hook occurs during the lost motion, and after there is no further lost motion, the recliner actuation link acts upon the recliner control crank in order to unlock the rotary recliner, said recliner actuation link and recliner lever being biased to return to their original positions.

DETAILED DESCRIPTION OF PREFERRED EMBODIMENTS

Figure 1:
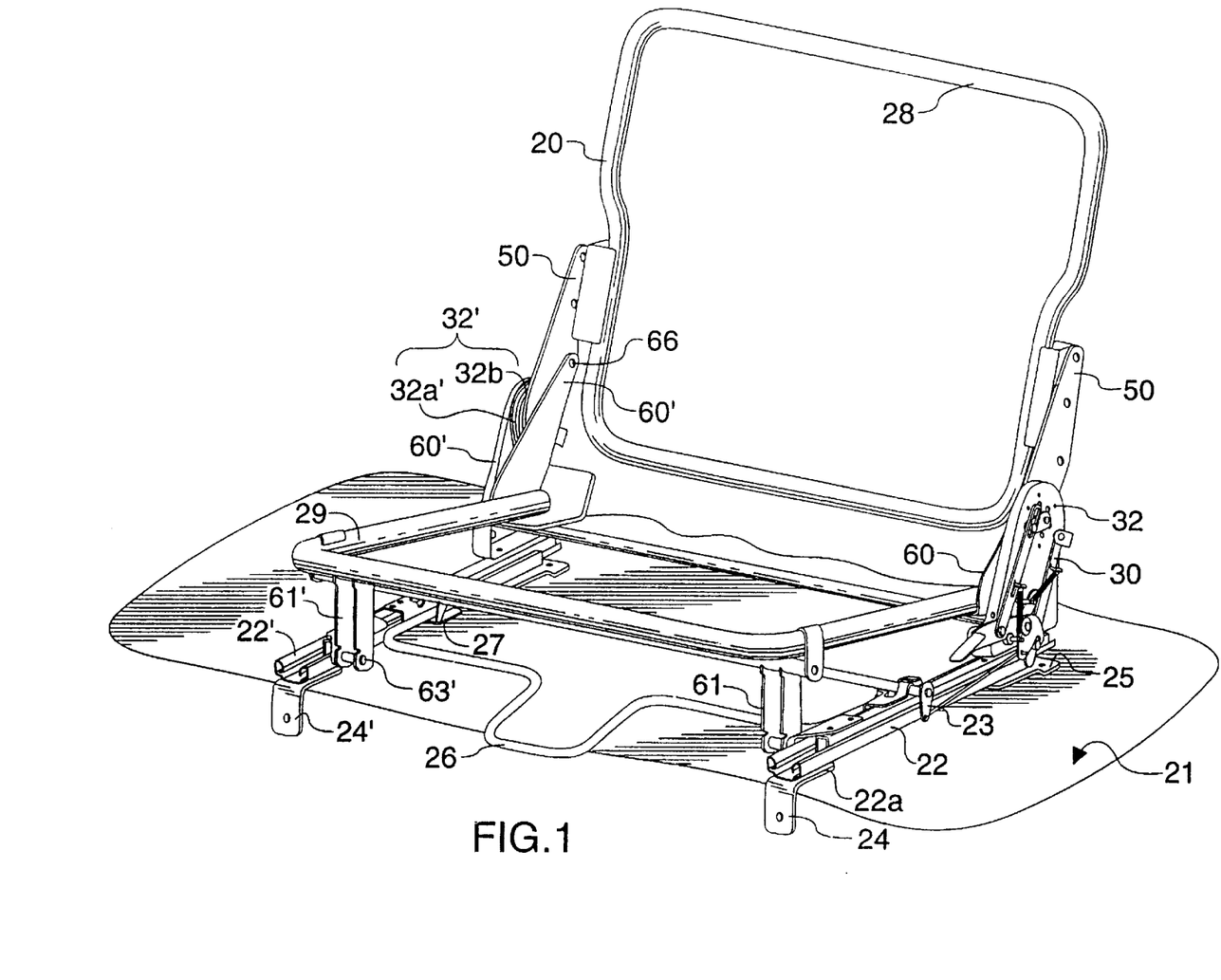
FIG. 1 is a perspective view of a preferred embodiment of a vehicle seat assembly of the present invention attached to the floor of a vehicle, with the seat back support frame and the seat support frame of the assembly each shown in the normal operating position.

In FIG. 1 of the drawings, there is shown a preferred embodiment of the vehicle seat assembly 20 according to the present invention, installed on a vehicle floor 21 (partially shown) of a vehicle (not shown). The seat assembly 20 is mounted on a left track assembly 22 and a right track assembly 22'. Left track assembly 22 is secured to the vehicle floor 21 by front floor mounting bracket 24 and rear floor mounting bracket 25. Similarly right track assembly 22' is secured to floor 21 by similar floor mounting brackets 24' and 25'.

Figure 2:
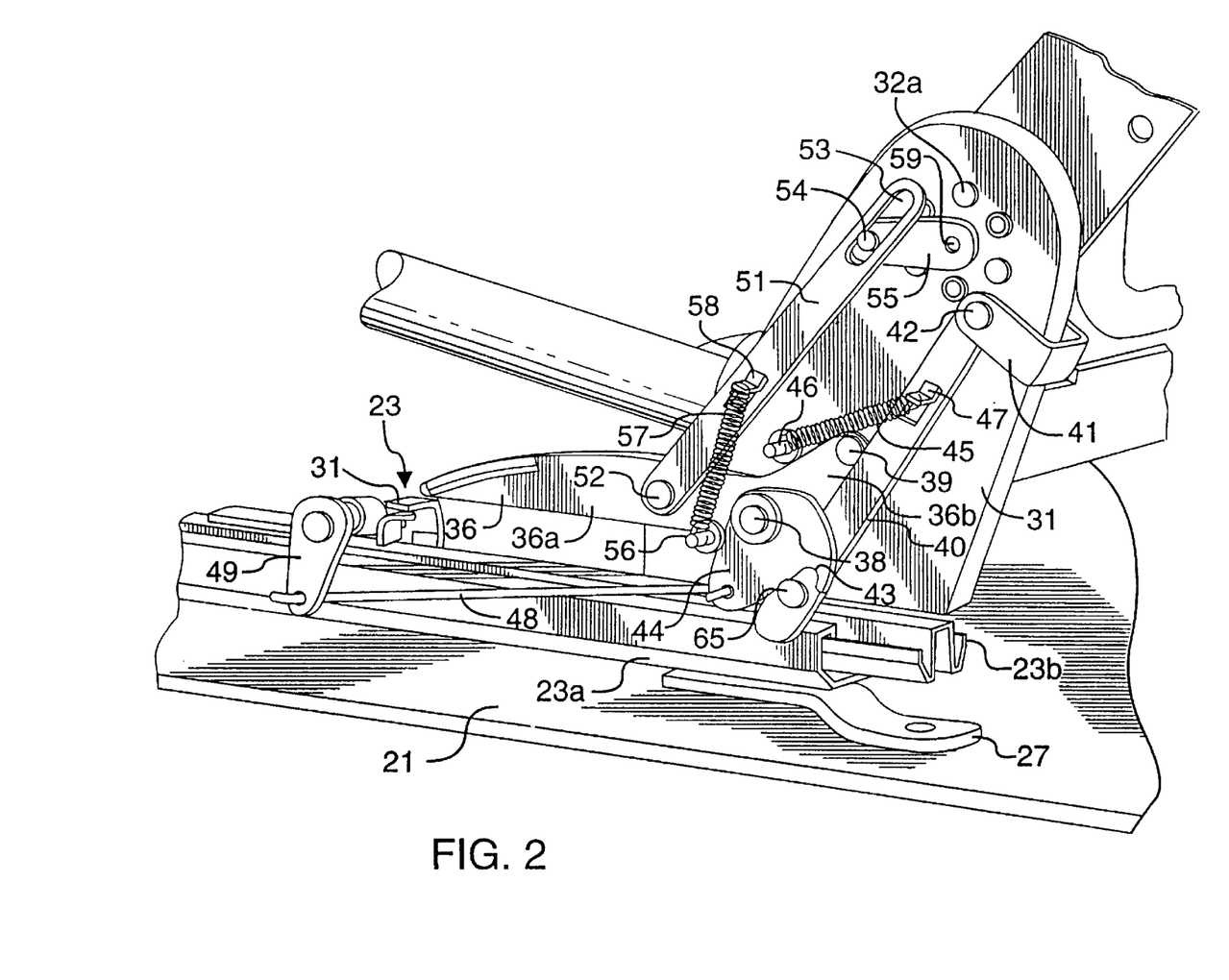
FIG. 2 is a perspective view from the rear left of part of the vehicle seat assembly of FIG. 1, showing seat control mechanisms.
Figure 3:
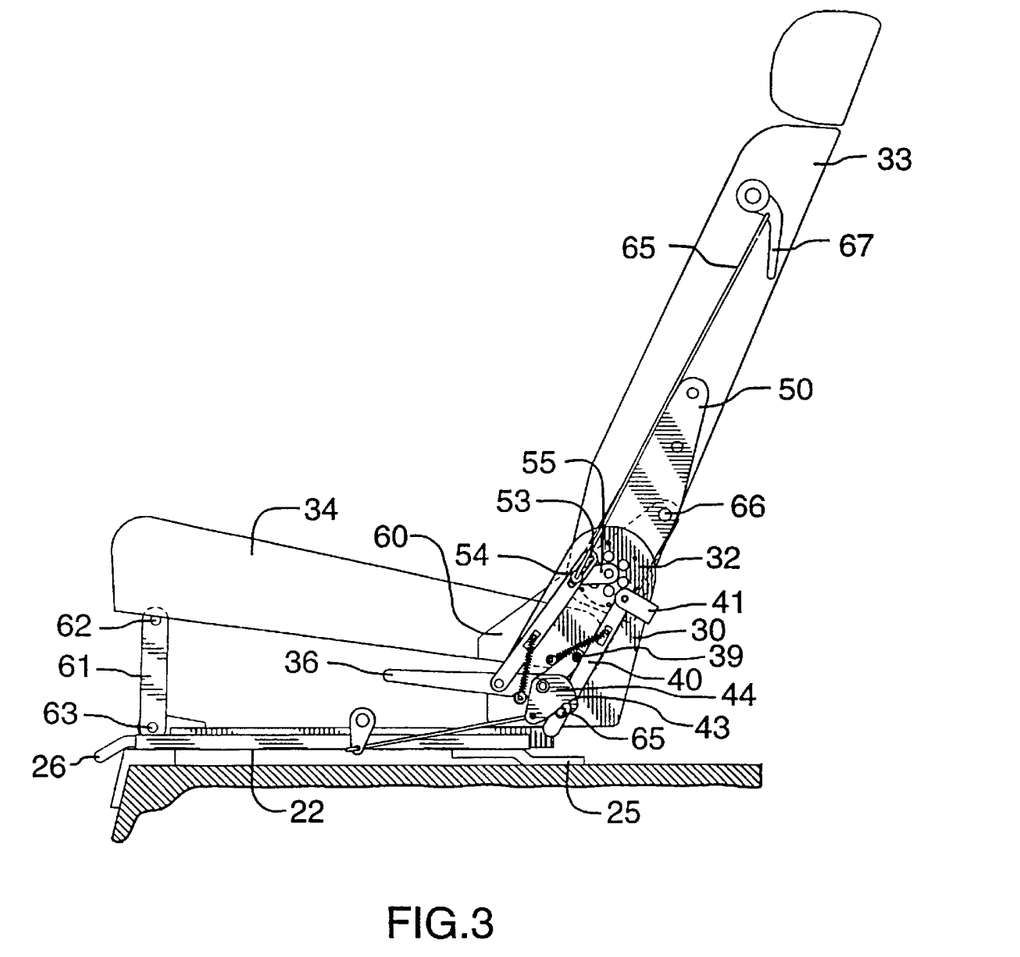
FIG. 3 is a side elevational view of the vehicle seat assembly, seen from the left side, with the seat and seat back in the normal operating position.
Figure 4:
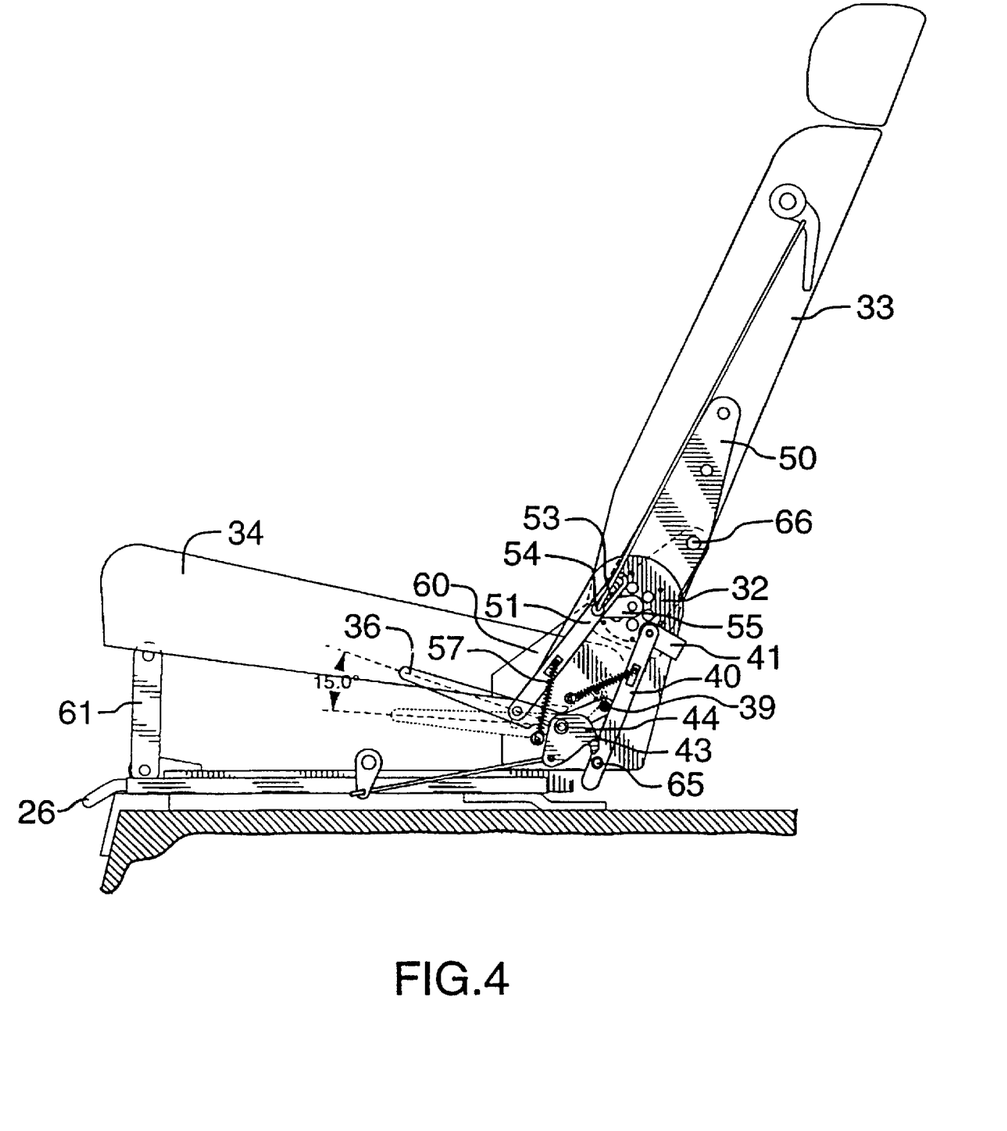
FIG. 4 is a side elevational view of the vehicle seat assembly of FIG. 3, a recliner control lever being disengaged from an interlock for the E-Z entry control mechanism.
Figure 11:
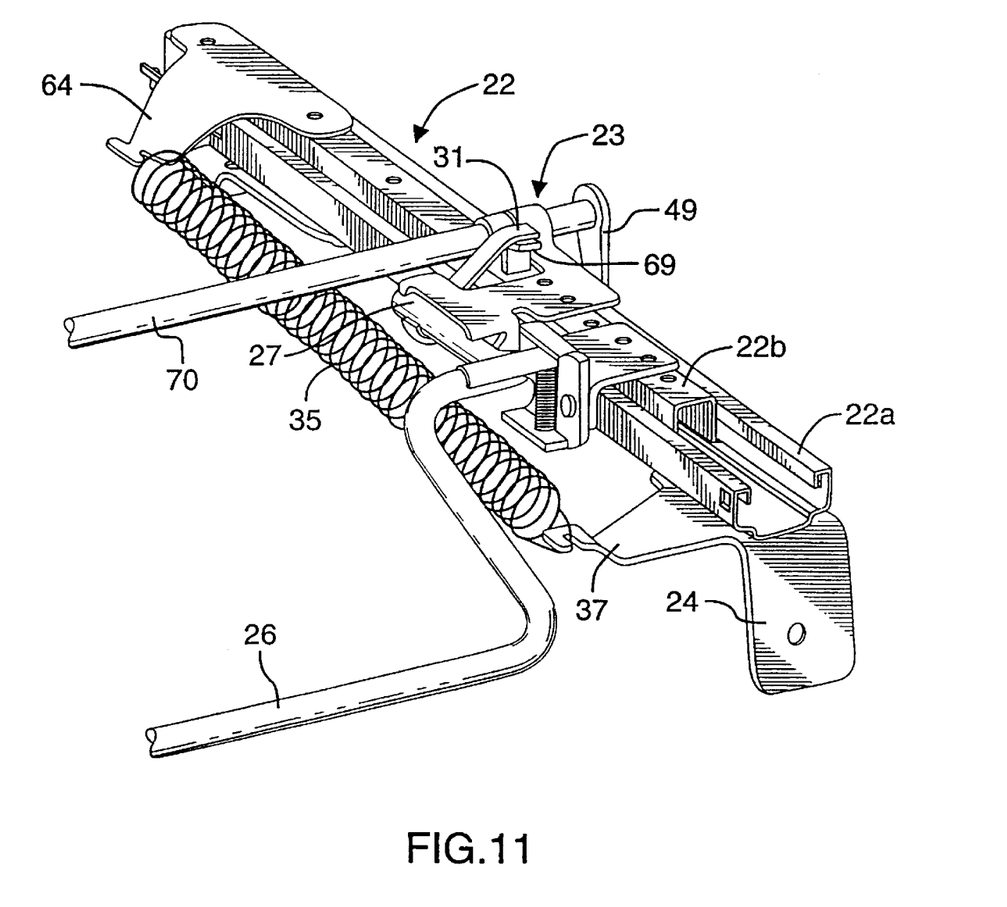
FIG. 11 is a perspective view from the front right of a left side track mechanism of the vehicle seat assembly of FIG. 1, showing track release mechanisms.

The track assemblies are best seen and understood by reference to FIGS. 1, 2 and 11. Similar members in the right and left hand track assemblies have similar numbers except that numerals for the right hand track assembly have a prime after the numeral, e.g. 22 (left side), 22' (right side). For clarity of most of the description, only the left side is described, even though reference may be made to FIG. 2 which shows the right side, unless otherwise indicated.

The seat track assemblies 22 and 22' may be used to adjust the position of the entire seat assembly in the fore and aft directions. Seat track assembly 22 has a lower seat track section 22a which is bolted or otherwise affixed to the vehicle floor, e.g. through front and rear floor mounting brackets 24, 25. An upper seat track section 22b slides within the lower track 22a in operatively confined relation. A selectively engageable track lock 23 controls the selective sliding of the upper track 22b and lower track 22a track sections relative to each other.

A user may unlock the track lock 23 for selective adjustment of the fore and aft positioning of the seat assembly by grasping handlebar 26 and pulling same upwardly, which in turn causes pivoting of an end 27 of the handlebar 26 into operative contact with a track lock actuation member 31, thus releasing the track lock mechanism 23. Spring 35 is connected at one end to rear plate 64, which is attached to the rear of upper track 22b, and at the other end to a lug 37 on front floor mounting bracket 24. Release of the track lock 23 allows the tensile force in spring 35 to pull upper track 22b forward relative to lower track 22a. Such an intersliding track assembly is known. It will be understood that other, mechanically equivalent, track assemblies may be used within the scope of the present invention.

The vehicle seat assembly shown in FIG. 1 has a seat back support frame 28, a seat support frame 29, the two seat track assemblies 22 and 22', at least two rear support brackets 30 and 30', and a seat control assembly, which will be described in more detail hereinafter.

The inclination of seat back support frame 28 is adjustable with respect to the seat support frame 29 by means of a rotary recliner mechanism 32. A seat back 33 (not shown in FIG. 1 but shown in FIGS. 2 to 10) may be conventionally mounted on the seat back frame 28, and a seat cushion 34 (not shown in FIG. 1 but shown in FIGS. 2 to 10) may be conventionally mounted on seat support frame 29. Recliner mechanism 32 is rigidly affixed by its outer half 32a to rear support bracket 30. Rear support bracket 30, in turn, is rigidly affixed to the rear of upper track 22b.

The inner half 32b of the rotary recliner 32 is able to rotate axially with respect to outer half 32a of the recliner 32. Inner half 32b is affixed to the seat back support frame 28 through a mounting plate 50, which plate 50 is rigidly attached to a side of the seat back support frame 28. The recliner mechanism 32 may be selectively actuated by means of a rocker lever 36, which is operatively connected to the reclining mechanism 32 for movement from a locked configuration to an unlocked configuration.

As will be seen most clearly in FIG. 2, rocker lever 36 is a first class lever which pivots about a pivot pin 38. Rocker lever 36 has an arm 36a which is a handle portion, and a thruster arm 36b which is on the opposing side of pivot pin 38 from arm 36a. The end of thruster arm 36b, distal from pivot pin 38, has a follower 39 attached thereto. When arm 36a is lifted upwards, follower 39 is caused to rotate about pivot pin 38 and push on interlock link member 40. Clevis 41 extends around rear support bracket 31. One arm of clevis 41 is fixedly attached to the inner rotatable half 32b of the rotary recliner 32. The other arm of clevis 41 is attached to the upper end of interlock link member 40 by pivot pin 42. The lower end of interlock link member 40 has an interlock pin 65 which, under certain circumstances, may be engaged with latch hook portion 43 of interlock crank 44. Interlock link member 40 is biased to be in contact with follower 39 by spring 45, which is attached at one end by pin 46 to rear support bracket 31 and at the other end by lug 47 to interlock link member 40.

Interlock crank 44 is pivoted about pivot pin 38 and is operatively attached to an E-Z entry track lock crank 49 by an E-Z entry connecting link 48.

A lower end of recliner actuation link 51 is attached to the rocker lever 36 at pivot point 52. Pivot point 52 is between pivot pin 38 and the end of arm 36a distal from pivot pin 38. Recliner actuation link 51 has a lost motion slot 53 adjacent its upper end. Recliner actuation rocker lever 36 is biased to be in a downward position, against stop pin 56, by spring 57, which is attached at one end to stop pin 56 and at the other end to lug 58. Lug 58 is attached to recliner actuation link 51. Lost motion slot 53, in recliner actuation link 51, is dimensioned and otherwise adapted to make urging contact with a drive pin 54 positioned on an end of recliner control crank 55. Recliner control crank 55 is pivotable about axis 59 and operates a conventional locking and unlocking mechanism (not shown) internal to the rotary recliner mechanism 32. Axis 59 is coaxial with the rotary axes for outer and inner halves 32a and 32b, respectively.

As indicated above, inner half 32b of rotary recliner 32 is affixed to the seat back support frame 28 through a mounting plate 50. Mounting plate 50 is rigidly attached in a conventional manner, e.g. rivetted or bolted, to a side of the seat back support frame 28. As will be seen more clearly in FIG. 1, the rear of seat support frame 29 is attached to rear seat mounting bracket 60. Rear seat mounting bracket 60 is pivotally attached to mounting plate 50 at an axis which is above the rotational axis 59 of rotary recliner mechanism 32, i.e. at pivot 66.

The front of seat support frame 29 is connected to the front portion of upper tracks 22b and 22b' by means of pivoting front leg members 61 and 61', respectively. Front leg member 61 is pivotally attached to seat support frame 29 at upper pivot 62 and pivotally attached to upper track 32b at lower pivot 63.

Operation of the reclining mechanism through manipulation of the recliner actuation rocker lever 36 is now described with particular reference to FIGS. 3 to 7. When a seat occupant wishes to adjust the inclination angle of the seat back 33 within the range of occupiable positions, the occupier grasps the free end of recliner actuation rocker lever 36 and pulls same upwardly. The rocker lever 36 rotates about pivot pin 38, and the first part of such rotation of the rocker lever 36, e.g. typically up to about 15°, (see FIG. 4) causes follower 39 to push against interlock link member 40. Interlock link member 40 is thereby pivoted about pivot pin 42 and so causes interlock pin to be pushed away from engagement with latch hook 43.

It will be noted that during this first motion of recliner actuation rocker lever 36, e.g. over the first 15° of rotary motion of the lever 36, there is no release of the recliner mechanism 32. This is because, although raising arm 36a causes recliner actuation link 51 to be lifted, the positioning and size of lost motion slot 53 ensures that recliner actuation link 51 does not push on drive pin 54. It is only upon rotation of the recliner actuation rocker lever 36 beyond 15° of said clockwise rotation that recliner actuation link 51 is able to exert pressure on drive pin 54 to cause rotation of recliner control crank 55. It will be understood that the figure of 15° is given for illustrative purposes only, and the actual permitted degree of rotation of lever 36 may be different, if desired.

Figure 5:
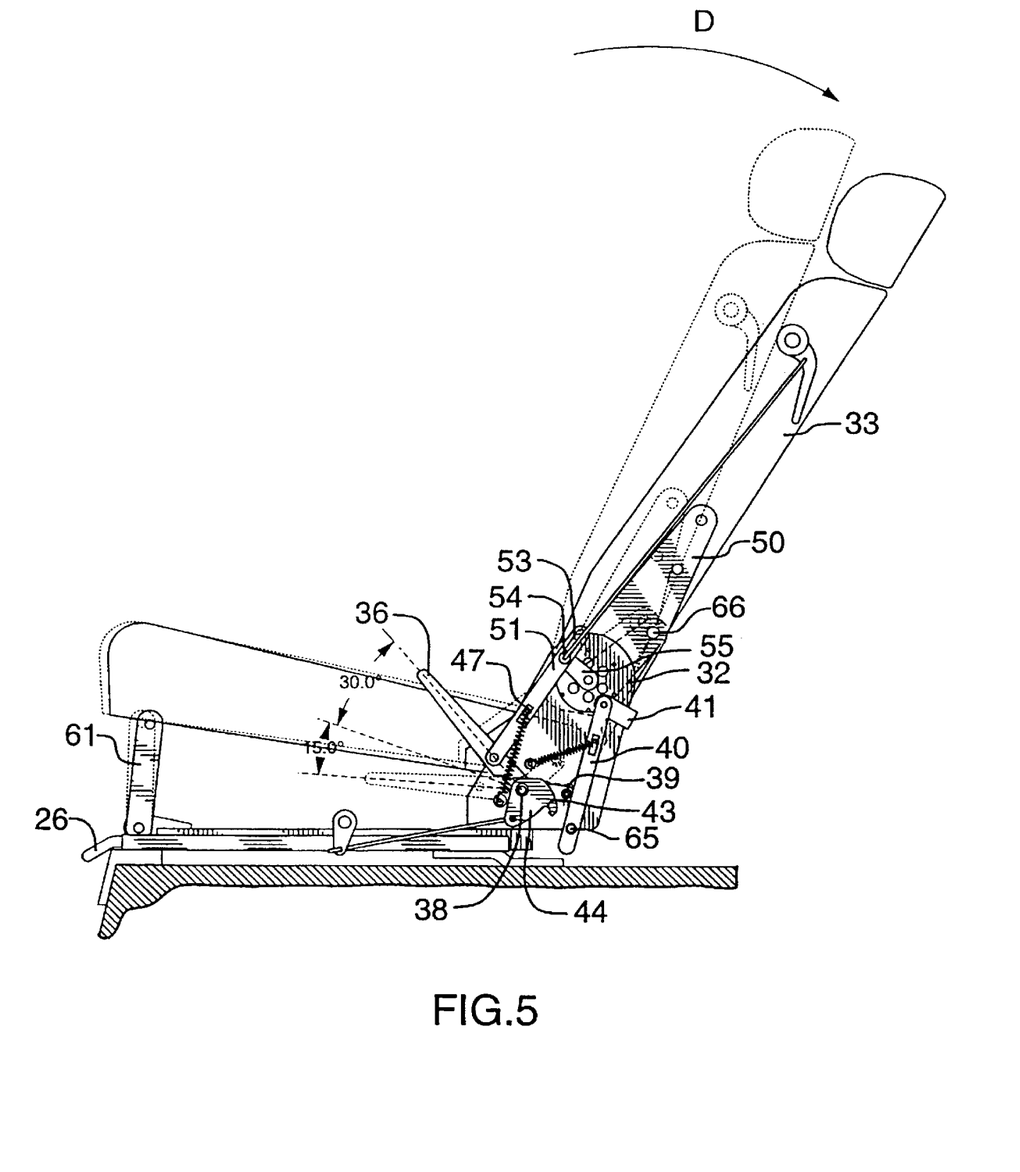
FIG. 5 is a side elevational view of the vehicle seat assembly of FIG. 3, showing, in phantom, the seat back being reclined as a result of actuation of the recliner control lever.

With further movement of recliner actuation rocker lever 36 (see FIG. 5), e.g. in the next 30° of rotation of the rocker lever 36, the recliner actuation link 51 pushes the recliner control crank 55 about axis 59, by means of engagement of the lower end of slot 53 with drive pin 54. Such movement of control crank 55, about axis 59, causes unlocking of the recliner mechanism 32, which in turn allows for manual adjustment of the inclination angle of the seat back 33 by the occupant. As shown in FIG. 5, the seat back 33 may be moved from the position shown in phantom to that shown by solid lines (indicated by arrow D), or vice-versa. Release by the occupant of the recliner actuation rocker lever 36 allows rocker lever 36 to return to its original position by means of biasing spring 57. Release of recliner actuation rocker lever 36 thus causes the rotary recliner mechanism 32 to once again lock up at the newly selected position of the seat back 33.

It will be appreciated that, during rotation of the seat back 33, the inner half 32b of the rotary recliner mechanism 32 rotates with the seat back support frame 28 about the same horizontal rotational axis 59. This rotary motion is translated to the interlock link member 40 by means of clevis 41, which is attached to the inner rotatable half 32b of the rotary recliner. In this manner, rotation of the inner half 32b of the recliner 32 causes the interlock link member 40 to move in an arcuate path centred about the axis of recliner mechanism 32. It will be noted that the axis of rotation of interlock link member 40 is the same axis of rotation of the seat back support frame 28. As the interlock pin 65 of the interlock link member 40 has been pushed clear of urging interaction with the latch hook member 43 of the interlock crank 44 during the initial 15° of rotation by the seat occupant, such rotation of the inner half 32b will have no effect upon the E-Z entry release mechanism of which the interlock crank 44 forms a part. Thus, an occupant, when manipulating the reclining mechanism by means of rocker lever 36, the E-Z entry mechanism cannot be triggered inadvertently.

Figure 6:
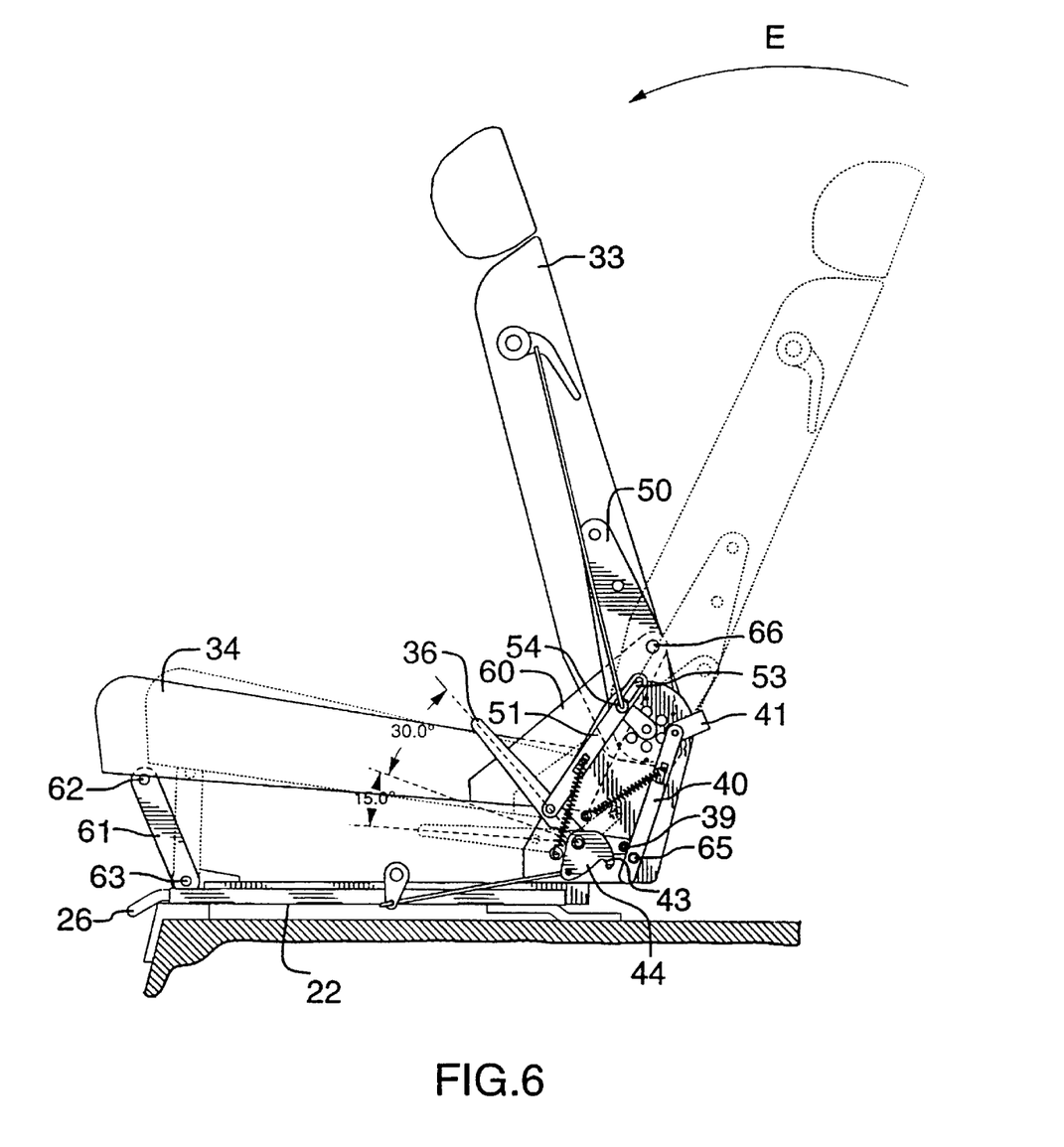
FIG. 6 is a side elevational view of the vehicle seat assembly of FIG. 5, showing the seat back being moved forward towards the dump position.
Figure 7:
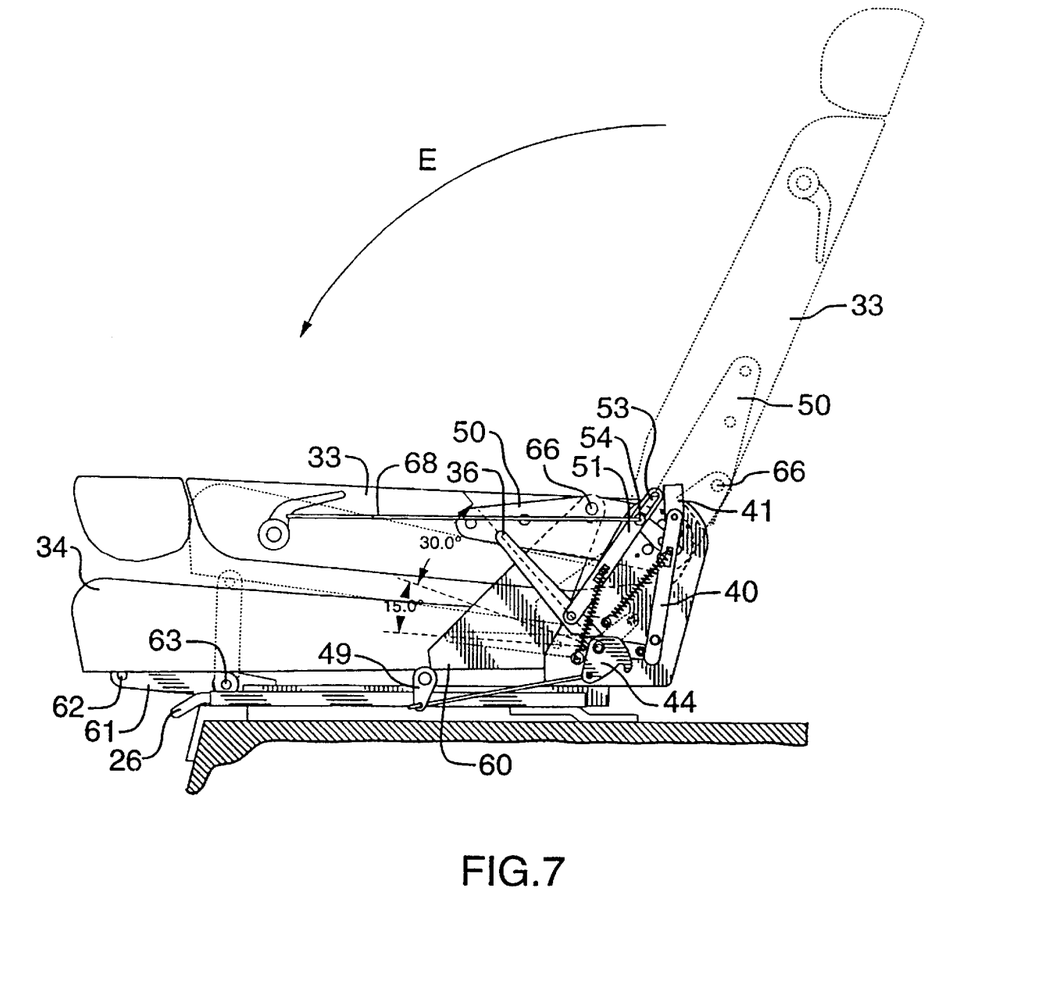
FIG. 7 is a side elevational view of the vehicle seat assembly of FIG. 5, showing the seat and seat back in a load floor configuration.
Figure 8:
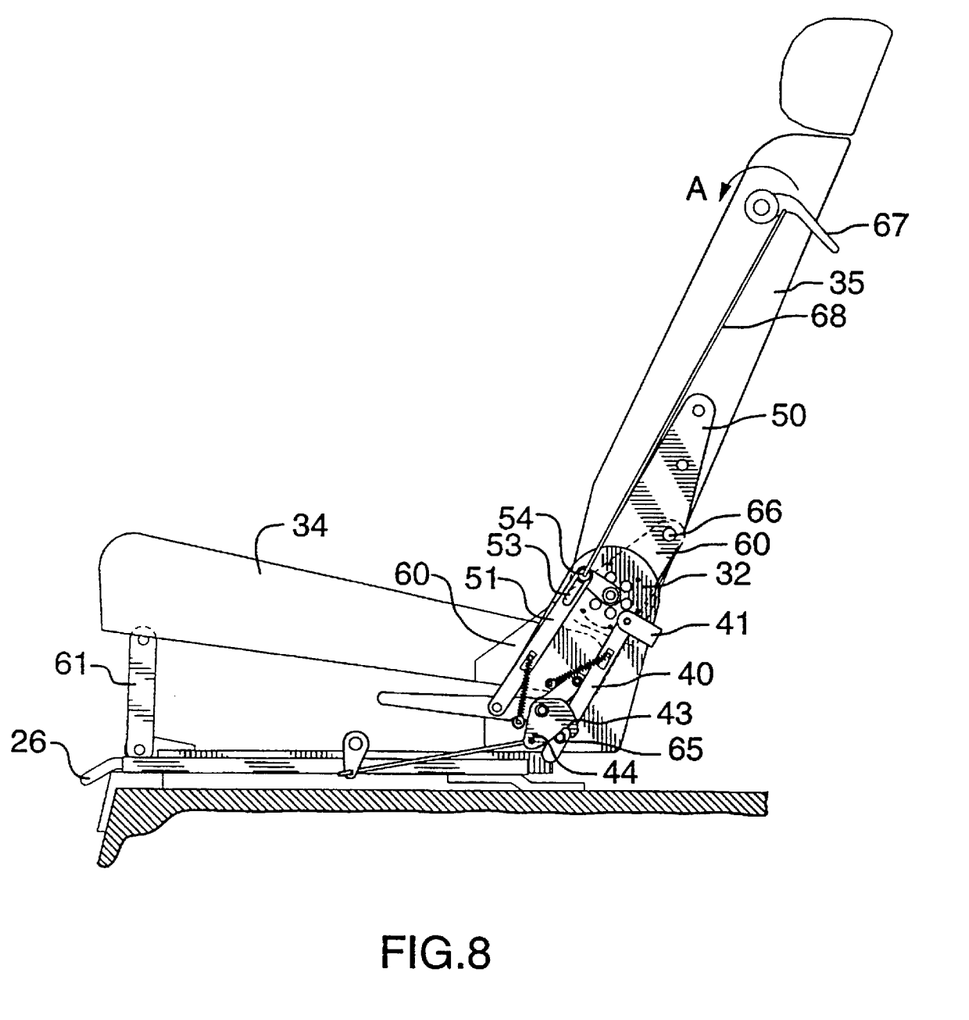
FIG. 8 is a side elevational view of the vehicle seat assembly of FIG. 3, showing initial movement of an E-Z entry control handle.

FIGS. 6 and 7 show the seat back 33 being tipped forward in the direction of arrow E, toward the dump position. It will be clear that when an occupant is in the seat, seat back 33 cannot move into the dump position. It will also be seen that when seat back 33 is tipped forward, seat support frame 29 and associated seat cushion 34 are caused to move forwardly. The cause of such motion is the fact that rear mounting seat bracket 50 is pivotally attached to seat back support frame 28 at pivot point 66 (best seen in FIGS. 1, 3, 4 and 6), and movement of rear seat 33 forwardly causes pivot point 66 to move forwardly. Horizontal and vertical movement of seat cushion 34 relative to seat track assembly 22 is then controlled by pivoting actions about pivot point 66, upper pivot 62, lower pivot 61 and recliner rotational axis 59. These four pivot points are at the corners of a parallelogram.

It will be apparent from the foregoing description that the seat back support frame 28 is able to be rotated by the user for forward folding (see FIG. 6), rearward reclining (see FIG. 5), or even for forward dumping of the seat back 33 (assuming that there is no occupant in the seat—see FIG. 7).

When the seat assembly is in the dumped position, the recliner actuation rocker lever 36 may be returned to its initial lowered position, as the rotary recliner 32 is held open by a known internal feature (not shown) until the seat assembly reaches the "load floor" position of FIG. 7. When the seat assembly is in the load floor position, the recliner 32 automatically locks in a known manner, and thereafter requires further user activation of the recliner actuation rocker lever 36 to unlock the mechanism.

Dumping may be required for easy access of a passenger behind the seat assembly, or with respect to station wagons, mini-vans or so-called sport-utility vehicles, to use the rear surface of the seat back as a load floor to support cargo within the vehicle.

A key feature to understanding the composite motion of the present E-Z entry feature is the parallelogram type mounting of the seat support frame 29 to the upper track section 22b as described hereinabove. Such arrangement allows the seat support frame to translate forwardly and downwardly towards the vehicle door upon "unlocking" of a single point of the parallelogram.

In the embodiment shown, the recliner mechanism 32 controls this unlocking feature for all seat functions in the manner hereinafter described in more detail. As will be understood, the recliner mechanism 32 can be replaced by a single latch mechanism (not shown). Such a latch mechanism would, in effect, provide a non-adjustable recliner mechanism having only one locked position. Such an alternative embodiment remains within the scope of the present invention.

The activation of the E-Z entry function according to the invention will now be described with particular reference to FIGS. 2, 3, and 8–11.

Cable link 68 is attached at its upper end to E-Z entry handle 67 and at its lower end to the distal end of the recliner control crank 55, i.e. adjacent to drive pin 54. Rotation by a user of the E-Z entry handle 67 in the direction of arrow "A" (see FIG. 8) causes rotation of recliner control crank 55 by means of interconnecting cable link 68, or other suitable means. This action, in turn unlocks rotary recliner 32. Because of the presence of lost motion slot 53, such movement of the recliner control crank 55 will not cause any movement of the recliner actuation link 51. With the rotary recliner 32 thus opened, the seat back support 29 may be pushed forward. The seat back 33 and seat cushion 34 may thereafter be moved in a forwardly and downwardly motion about the parallelogram pivot linkages as described hereinabove in relation to the operation of the recliner mechanism. However, interlock pin 65, located at the lower end of the interlock link member 40 is now aligned to catch the latch hook 43 in the interlock crank 44, as shown in FIG. 9.

Figure 9:
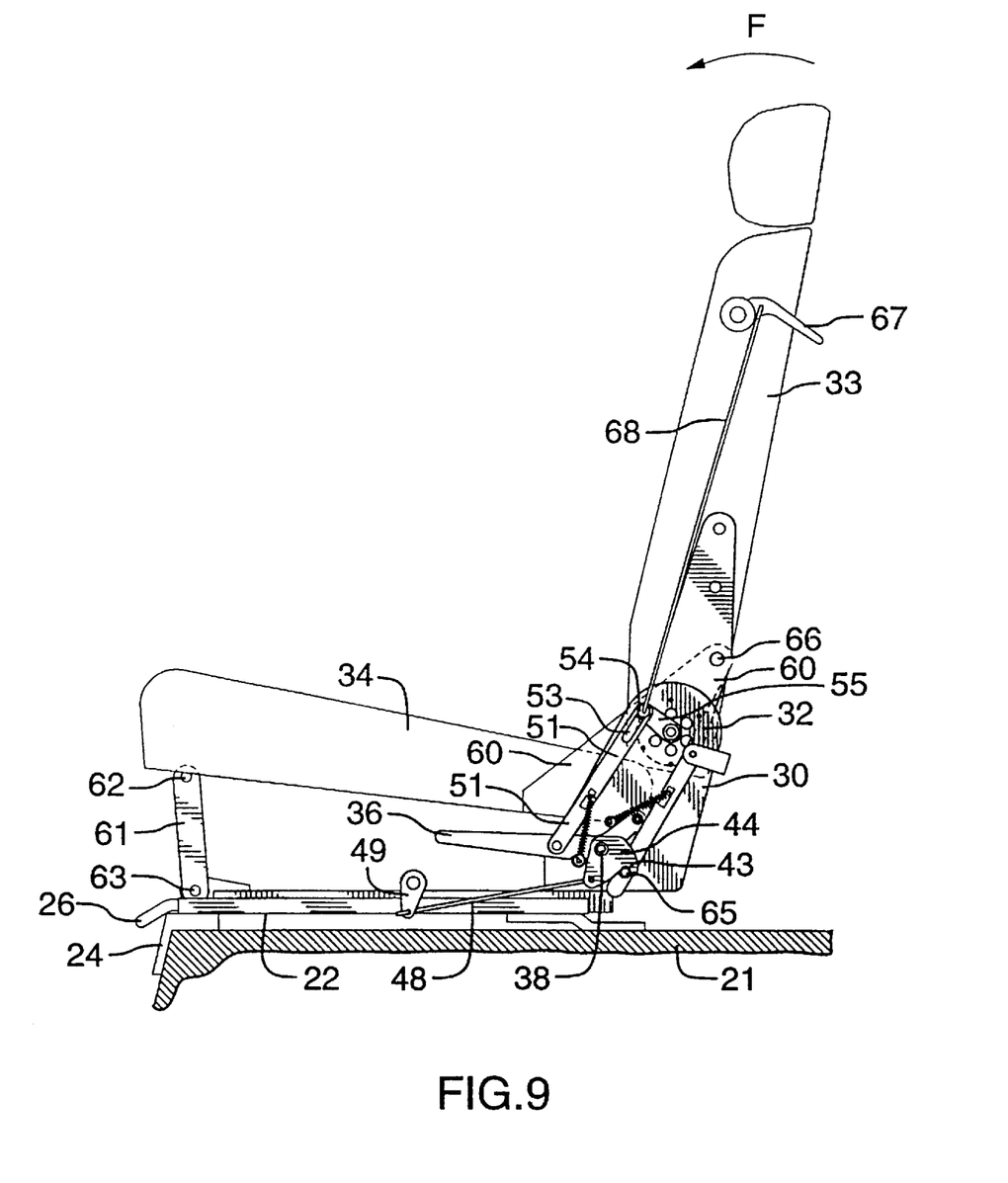
FIG. 9 is a side elevational view of the vehicle seat assembly of FIG. 8, showing the recliner control lever being engaged with the interlock for the E-Z entry control mechanism, and the seat back being moved forward towards the dump position.
Figure 10:
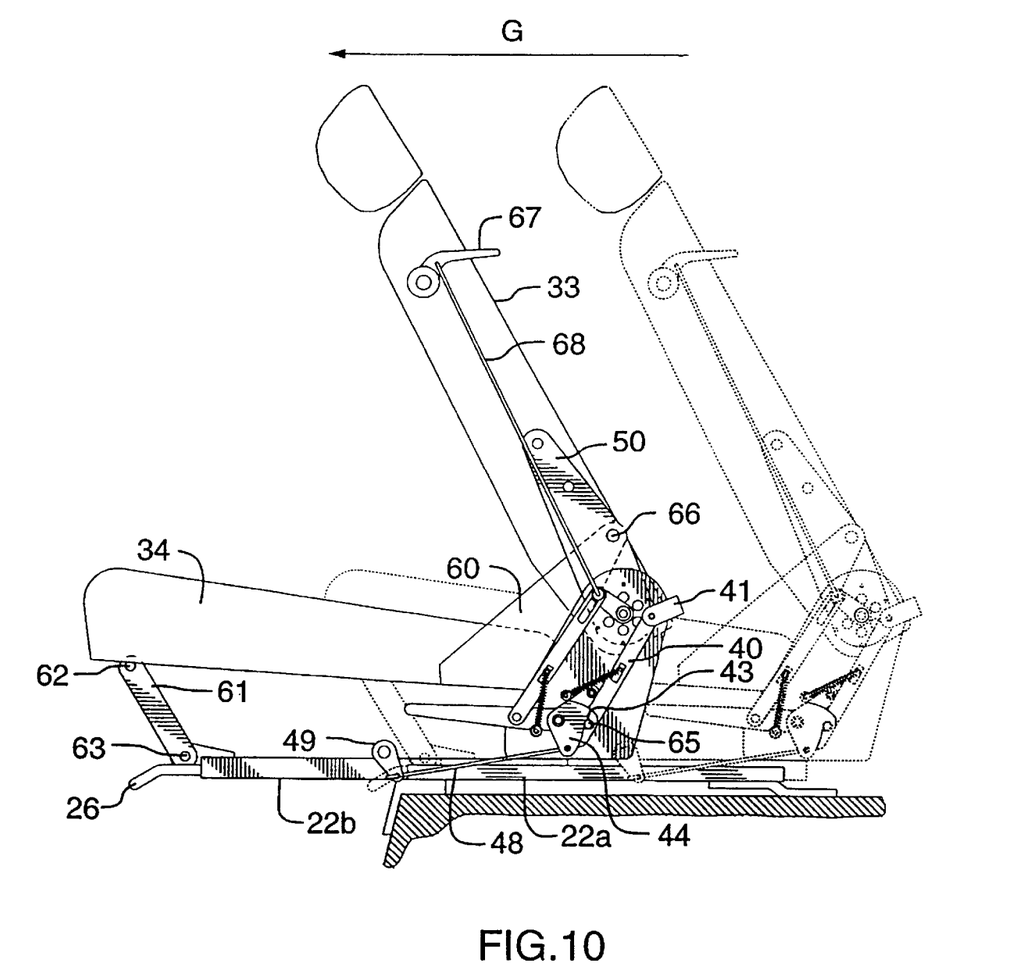
FIG. 10 is a side elevational view of the vehicle seat assembly of FIG. 9, showing the seat and the seat back moving towards the load floor position and the seat assembly moving forward on tracks from its rear position (shown in ghost outline) to its forward E-Z entry position.

Continued forward rotation of the seat back support 29 about rotary recliner 32 from the configuration of FIG. 9, i.e. in the direction of arrow F, thus causes rotation of the interlock crank 44 about pivot pin 38, which, in turn, causes a pulling on E-Z entry connecting link 48, e.g. a rod or cable. Pulling on E-Z entry connecting link 48, in turn, causes rotation of E-Z entry track lock crank 49. This action causes actuation of track lock actuation members 69 which are associated with track assembly 22, so that the track lock 23 is released. Left and right track locks are simultaneously controlled by means of connecting rod 70, which is coaxial with the rotational axis of E-Z entry track lock crank 49. Forward pivoting of the seat back support 29 (as shown in FIG. 10) thus completely unlocks the track lock mechanisms 23 and 23', and allows the seat to slide forward in the direction of arrow F, being pulled by a longitudinally oriented spring member 35, to the full forward E-Z entry position as shown in FIG. 10.

Thus, the illustrated seat assembly deploys only one single locking mechanism, i.e. the rotary recliner 32, in conjunction with a parallelogram type seat mechanism to achieve the composite functionality disclosed herein. Accordingly, the full E-Z entry forward sliding and downwardly translated movement of the seat support member can be obtained through actuation of a single handle 67. A known form of slave cable (not shown) preferably runs between the recliner control crank 55 of the rotary recliner 32 and the corresponding control crank of the rotary recliner 32' optionally located on the opposite outer side of the seat back support frame 28 to co-ordinate the locking and reclining action of the two rotary recliners 32 and 32' one with the other, as is known in the art.

It will be understood that there may be variations of various components of the described seat assembly without departing from the essentials of the invention.

What is claimed is:

1. A vehicle seat assembly, attachable to a vehicle floor, which vehicle seat assembly has a seat support frame, a seat back support frame, at least two seat track assemblies, at least two rear supports and a seat control assembly, wherein:

(a) each seat track assembly comprises a first track section attachable to the vehicle floor, and extending from front to rear when installed on the vehicle floor, a second track section which is slidably engaged with the first track section, and a track locking assembly having track locking means for locking first and second track sections together at any position from a forward position of the second track section to a rearward position of the second track section;

(b) each said rear supports are fixedly attached to a rear portion of a second track section and a bottom end of said seat back support frame is supported on the rear support, at a seat back pivot;

(c) a front of the seat support frame is supported by front links, each of which are pivotable at an upper end of the front link about the front of the seat support frame and are pivotable at a lower end of the front link about a front end of the second track section, and a rear of the said support frame is supported at a rear seat support pivot, said rear support pivot being attached to the seat back support frame between the seat back pivot and a head end of the seat back support frame; and (d) the seat control assembly has i) seat back locking means to lock the seat back support frame so that the seat back support frame is in a substantially upright position, ii) locking release means to release the seat back locking means so that the seat back support frame is able to pivot forwardly into a dump position and thus cause forward movement of the seat support frame and forward and downward movement of the front of the seat support frame about the upper pivots of the front links, and wherein the locking release means is interconnected with the track locking release means, for unlocking the track locking means when the seat back support frame is pivoted forwardly.

2. A vehicle seat assembly according to claim 1, wherein the seat back locking means is able to lock the seat back support frame at the seat back pivot.

3. A vehicle seat assembly according to claim 2, wherein the seat back pivot has a reclining mechanism associated therewith.

4. A vehicle seat assembly according to claim 3, wherein the seat back locking means has a rotary recliner which has inner and outer rotatable halves, said rotary recliner having a rotational axis coincident with the seat back pivot, said inner rotatable half being fixedly attached to the back support frame and the outer rotatable half being fixedly attached to a rear support, and the seat back locking means is able to lock the inner and outer halves in predetermined positions, and wherein the inner rotatable half has intermediate linkage means which 1) in a first instance permits limited forward rotation of the seat back support frame without causing the track locking means to unlock the first and second track sections, and 2) in a second instance, upon further forward rotation of the seat back support frame is connected to a track locking linkage which causes the track locking means to unlock the first and second track sections.

5. A vehicle seat assembly according to claim 4, wherein the seat control assembly has a recliner control crank which is connected to the seat back locking means at the seat back pivot, the recliner control crank being operatively connected to an E-Z entry control handle, and the intermediate linkage comprises a link member with a first end attached to the inner rotatable half and a second end operatively attached to the track locking means, said link member having a lost motion mechanism therein, said lost motion permitting rotation of the seat back support frame in the first instance.

6. A vehicle seat assembly according to claim 5, wherein the vehicle seat assembly additionally has a seat reclining control assembly which has recliner actuating means for operating the seat back locking means in the first instance and disconnection means for making the track unlocking linkage inoperative, said seat reclining control assembly being independent of the seat control assembly.

7. A vehicle seat assembly according to claim 4, wherein the vehicle seat assembly additionally has a seat reclining control assembly which has recliner actuating means for operating the seat back locking means in the first instance and disconnection means for making the track unlocking linkage inoperative, said seat reclining control assembly being independent of the seat control assembly.

8. A vehicle seat assembly according to claim 7, wherein the seat control assembly has a recliner control crank which is connected to the seat back locking means at the seat back pivot, said recliner control crank being operatively connected to an E-Z entry control handle, and the intermediate linkage comprises an interlock link member with a first end attached to the inner rotatable half and second end which has engaging means for engaging with a hook of a pivotable interlock crank, said interlock crank being operatively connected to the track locking means;

said vehicle seat assembly additionally having a seat reclining control assembly which comprises a first class recliner lever which has a first arm and a second arm between which is a recliner lever pivot, said first arm being a manually operable handle and the second arm being cooperatively engaged with the interlock link member such that rotation of the recliner lever in a first direction removes the engaging means from being able to engage with the hook, said first arm having pivotally attached thereto a recliner actuation link with a lost motion mechanism at an end distal to the first arm, said recliner actuation link lost motion being operatively connected to the recliner control crank such that movement of the engaging means away from the hook occurs during the lost motion, and after there is no further lost motion, the recliner actuation link acts upon the recliner control crank in order to unlock the rotary recliner, said recliner actuation link and recliner lever being biased to return to their original positions.

9. A vehicle seat assembly according to claim 4, wherein the seat control assembly has a recliner control crank which is connected to the seat back locking means at the seat back pivot, said recliner control crank being operatively connected to an E-Z entry control handle, and the intermediate linkage comprises an interlock link member with a first end attached to the inner rotatable half and second end which has engaging means for engaging with a hook of a pivotable interlock crank, said interlock crank being operatively connected to the track locking means;

said vehicle seat assembly additionally having a seat reclining control assembly which comprises a first class recliner lever which has a first arm and a second arm between which is a recliner lever pivot, said first arm being a manually operable handle and the second arm being cooperatively engaged with the interlock link member such that rotation of the recliner lever in a first direction removes the engaging means from being able to engage with the hook, said first arm having pivotally attached thereto a recliner actuation link with a lost motion mechanism at an end distal to the first arm, said recliner actuation link lost motion being operatively connected to the recliner control crank such that movement of the engaging means away from the hook occurs during the lost motion, and after there is no further lost motion, the recliner actuation link acts upon the recliner control crank in order to unlock the rotary recliner, said recliner actuation link and recliner lever being biased to return to their original positions.

10. A vehicle seat assembly according to claim 3, wherein the vehicle seat assembly additionally has a seat reclining control assembly which has recliner actuating means for operating the seat back locking means in the first instance and disconnection means for making the track unlocking linkage inoperative, said seat reclining control assembly being independent of the seat control assembly.

* * * * *